United States Patent
Crowder, Jr.

(10) Patent No.: US 12,497,242 B2
(45) Date of Patent: Dec. 16, 2025

(54) SPRING-LOADED BEARING ASSEMBLY

(71) Applicant: FRANTZ MANUFACTURING COMPANY, Sterling, IL (US)

(72) Inventor: Douglas E. Crowder, Jr., Rock Falls, IL (US)

(73) Assignee: FRANTZ MANUFACTURING COMPANY, Sterling, IL (US)

( * ) Notice: Subject to any disclaimer, the term of this patent is extended or adjusted under 35 U.S.C. 154(b) by 222 days.

(21) Appl. No.: 18/501,228

(22) Filed: Nov. 3, 2023

(65) Prior Publication Data

US 2025/0145380 A1    May 8, 2025

(51) Int. Cl.
*B65G 13/00*    (2006.01)

(52) U.S. Cl.
CPC .................................... *B65G 13/00* (2013.01)

(58) Field of Classification Search
None
See application file for complete search history.

(56) References Cited

U.S. PATENT DOCUMENTS

| | | |
|---|---|---|
| 423,415 A | 3/1890 | Damren |
| 5,048,661 A | 9/1991 | Toye |
| 5,289,913 A | 3/1994 | Fujio et al. |
| 5,421,441 A | 6/1995 | Mason |
| 5,865,290 A | 2/1999 | Scott et al. |
| D413,420 S | 8/1999 | Nimmo et al. |
| 6,053,298 A | 4/2000 | Nimmo et al. |
| 6,076,647 A | 6/2000 | Agnoff |
| 6,161,673 A | 12/2000 | Nimmo et al. |
| 6,209,702 B1 | 4/2001 | Agnoff |
| 6,419,070 B1 | 7/2002 | Agnoff |
| 6,454,077 B2 | 9/2002 | Nimmo et al. |
| 6,547,054 B2 | 4/2003 | Gamache |
| 6,554,117 B2 | 4/2003 | Henson et al. |
| 6,702,091 B2 | 3/2004 | Nimmo et al. |
| 6,782,996 B1 | 8/2004 | Wolf |
| 7,028,825 B2 | 4/2006 | Scott |
| 8,763,778 B2 * | 7/2014 | Lemay .................. B65G 39/09 492/47 |
| 10,472,179 B2 * | 11/2019 | Guerra .................. F16C 19/54 |
| 2003/0015394 A1 | 1/2003 | Nimmo et al. |
| 2003/0034222 A1 | 2/2003 | Gamache |
| 2004/0159528 A1 | 8/2004 | Wolf |
| 2005/0217967 A1 | 10/2005 | Scott |

FOREIGN PATENT DOCUMENTS

| | | |
|---|---|---|
| EP | 0278354 | 8/1988 |
| EP | 0423415 | 4/1991 |
| EP | 0558466 | 9/1993 |
| EP | 0621219 | 10/1994 |
| EP | 1433725 | 6/2004 |

(Continued)

*Primary Examiner* — Kavel Singh
(74) *Attorney, Agent, or Firm* — Barnes & Thornburg LLP

(57) ABSTRACT

A spring loaded bearing assembly includes first and second matched cartridge bearings disposed within a bearing cup. A sleeve is disposed radially between the cartridge bearings and the bearing cup. A bushing is disposed radially within the cartridge bearings. A shaft is disposed radially within the bushing in sliding engagement therewith. An end cap is connected to the A spring biases the shaft axially.

20 Claims, 9 Drawing Sheets

(56) References Cited

FOREIGN PATENT DOCUMENTS

| EP | 1592629 | 11/2005 |
| WO | WO 99/16686 | 4/1999 |
| WO | WO 03/011720 | 2/2003 |
| WO | WO 2004/071908 | 8/2004 |
| WO | WO 2005/097634 | 10/2005 |

* cited by examiner

SPRING-LOADED BEARING ASSEMBLY

BACKGROUND OF THE DISCLOSURE

Rollers for use in conveyor systems typically include a roller tube and a bearing assembly for rotatably supporting the roller tube at each end theerof. In use, the rollers may be required to support heavy objects. These loads are transferred to the bearing assemblies. Known bearing assemblies are prone to premature failure because they are unable to robustly support heavy loads over time.

SUMMARY OF THE DISCLOSURE

The present disclosure is directed to a spring-loaded bearing assembly for use, for example, as a bearing assembly for rotatably supporting a roller of a conveyor system. In an embodiment, the spring-loaded bearing assembly includes a bearing cup and first and second matched cartridge bearings disposed within the bearing cup. The bearing cup may be made of steel. An annular sleeve is disposed radially between the steel bearing cup and outer races of the first and second cartridge bearings. An annular bushing is disposed radially within inner races of the first and second cartridge bearings. The annular sleeve and the annular bushing may be made of polymeric material. An end cap is connected to an end of the annular bushing. A shaft is slidingly engaged with an interior surface of the annular bushing. A portion of the shaft defines a spring perch. A biasing member, for example, a helical compression spring, is disposed within an interior region of the annular bushing. The biasing member is captured between the end cap and the spring perch, and is configured to axially bias the shaft relative to the annular bushing. Other embodiments are contemplated as well, with the invention being defined solely by the appended claims.

DETAILED DESCRIPTION OF THE DRAWINGS

Figure 1:
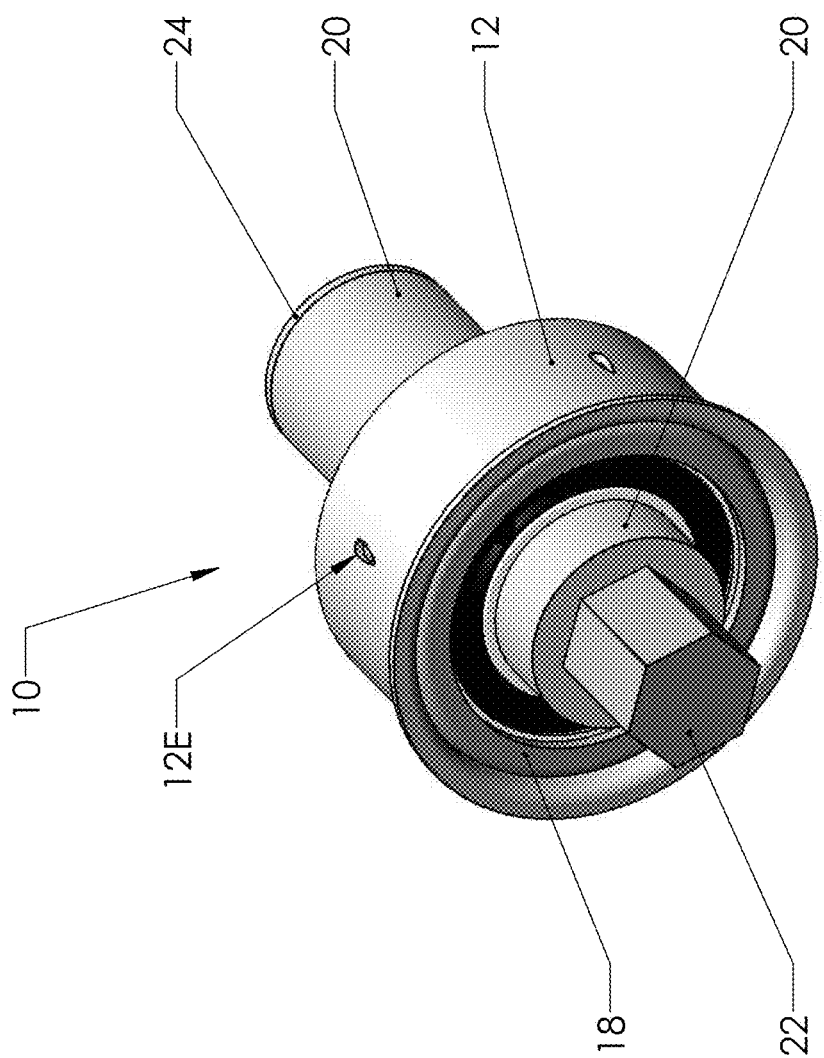
FIG. 1 is a front perspective view of a spring-loaded bearing assembly according to the present disclosure.
Figure 2:
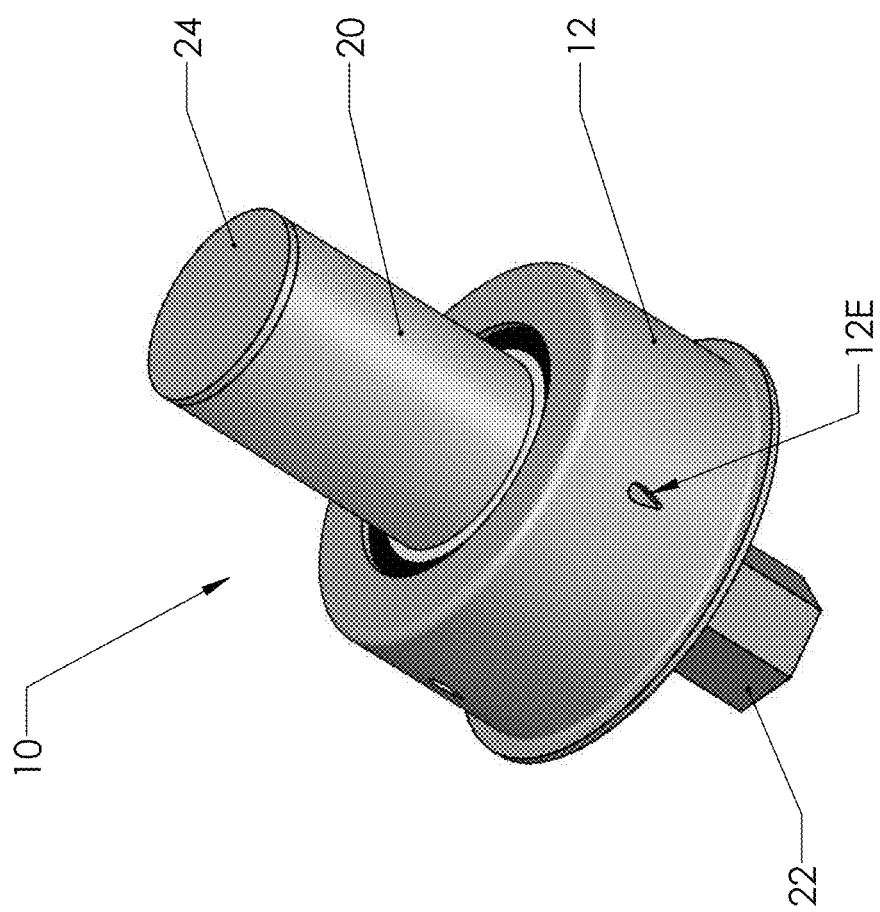
FIG. 2 is a rear perspective view of the spring-loaded bearing assembly of FIG. 1.
Figure 3:
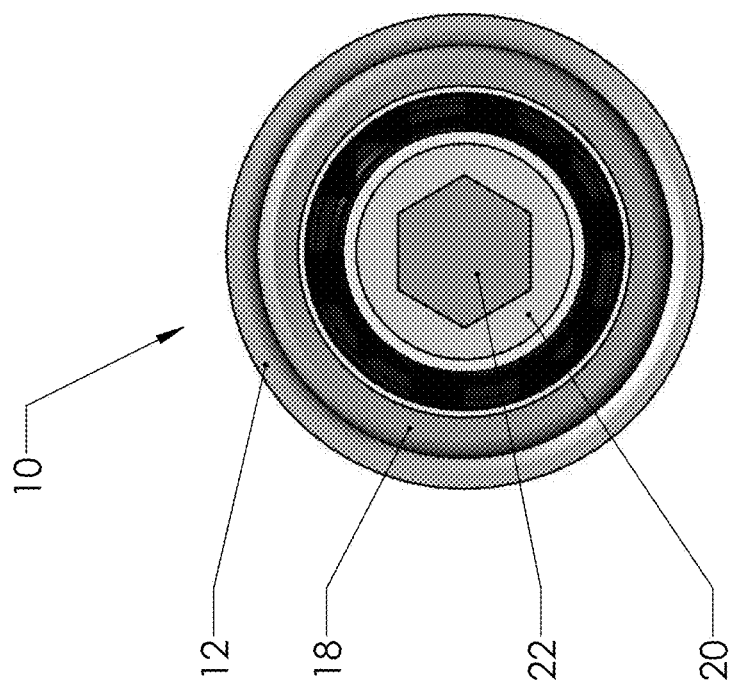
FIG. 3 is a front end view of the spring-loaded bearing assembly of FIG. 1.
Figure 4:
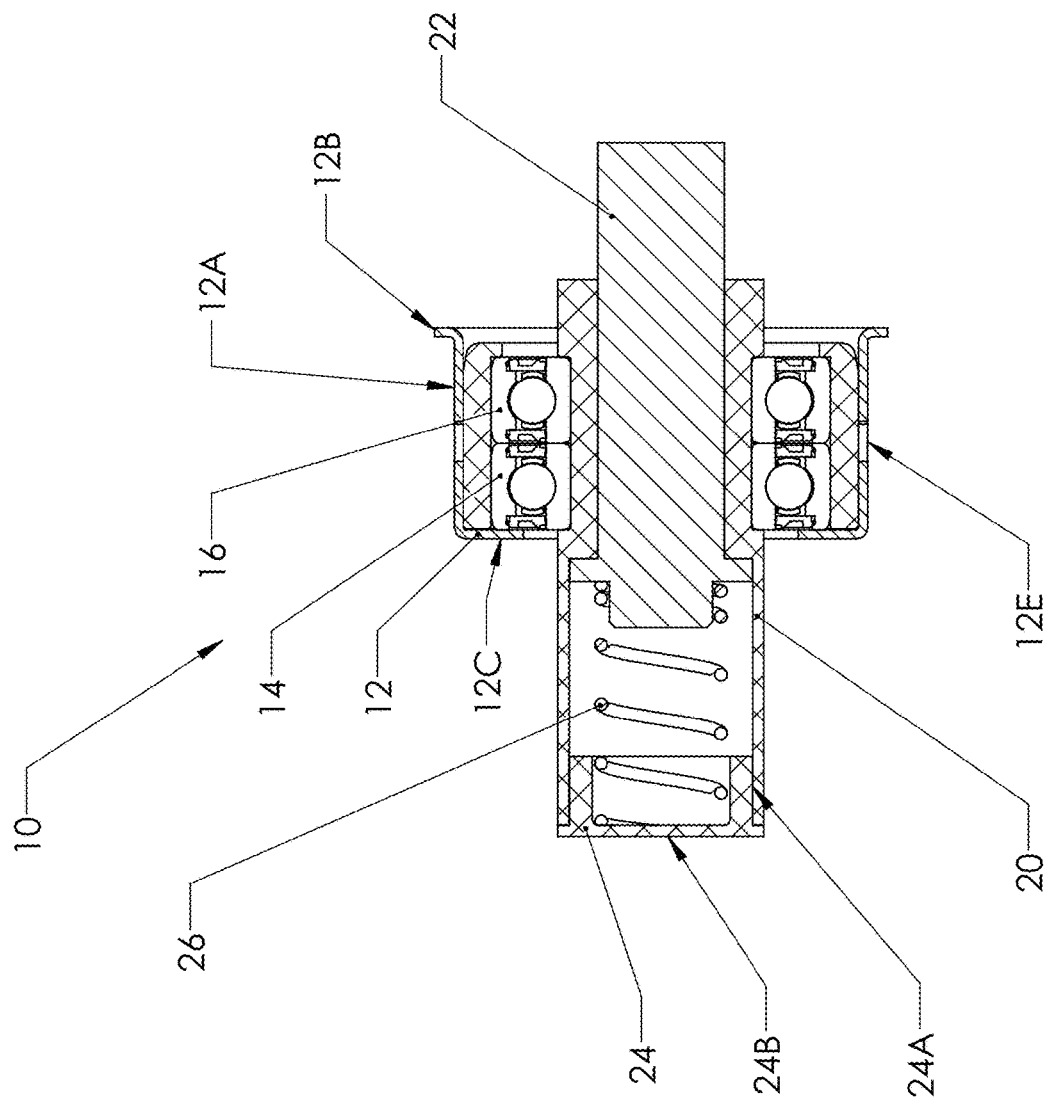
FIG. 4 is a cross-sectional side elevation view of the spring-loaded bearing assembly of FIG. 1.
Figure 5:
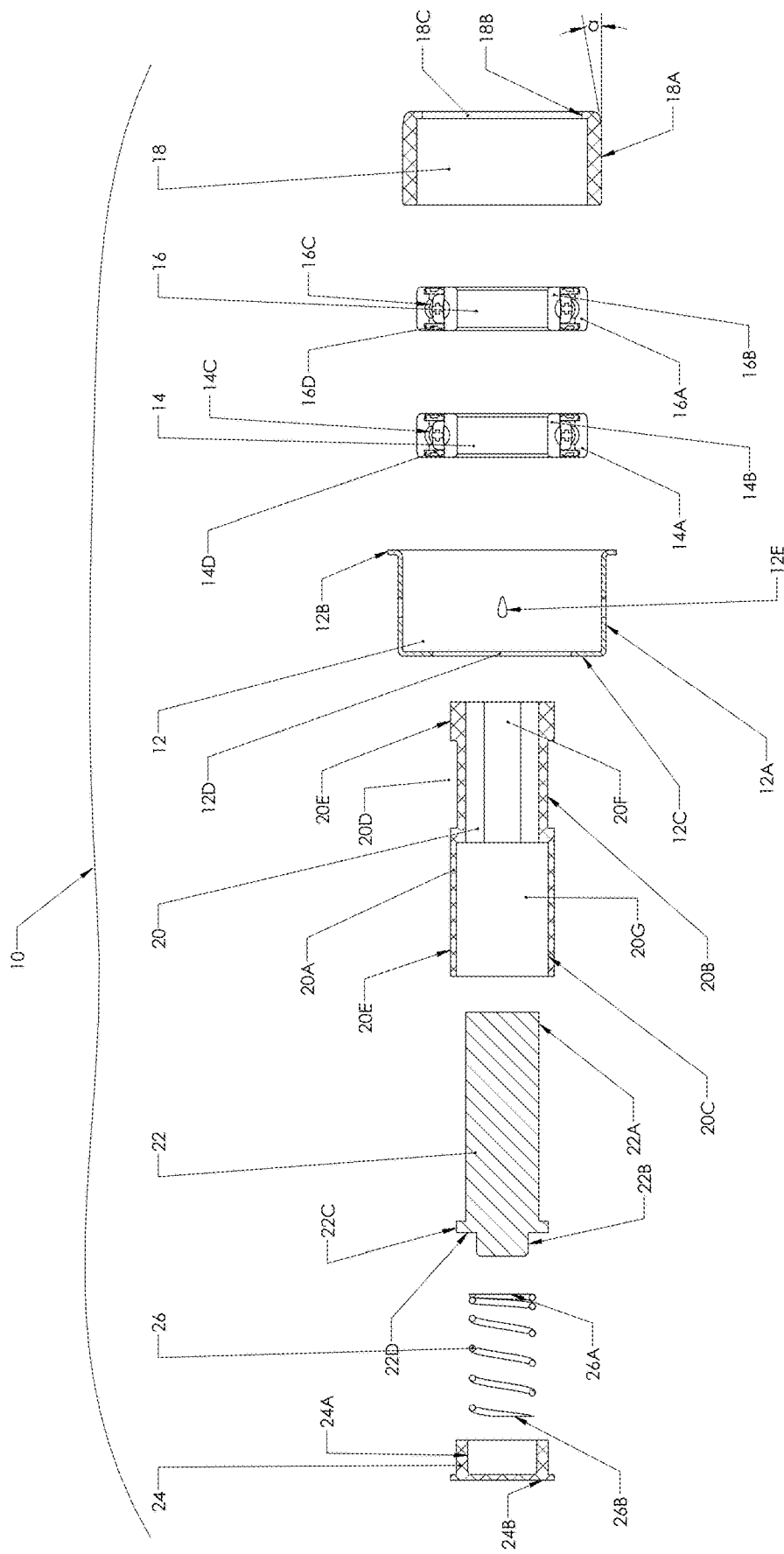
FIG. 5 is an exploded cross-sectional side elevation view of the spring-loaded bearing assembly of FIG. 1.
Figure 6:
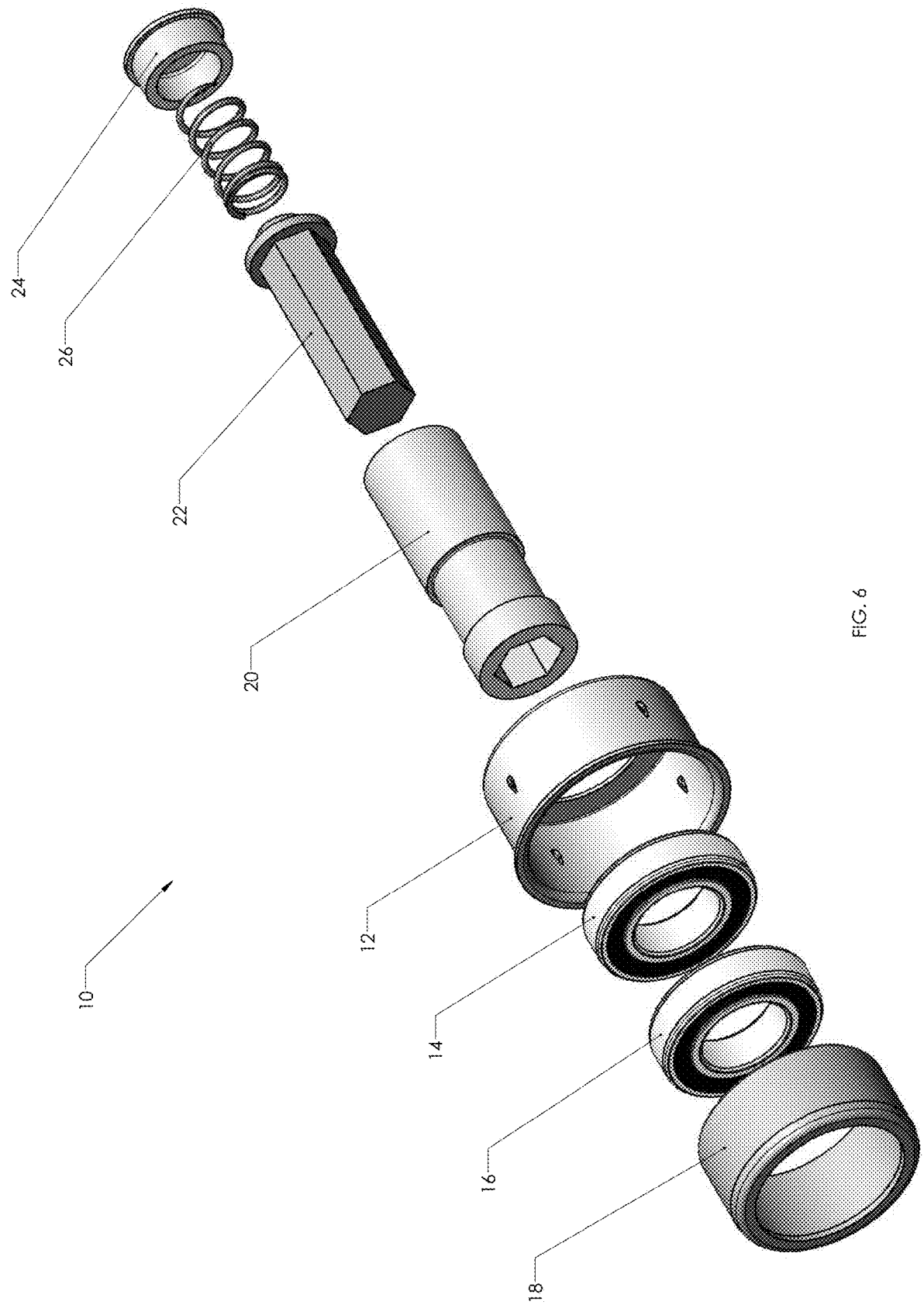
FIG. 6 is a end first exploded perspective view of the spring-loaded bearing assembly of FIG. 1.
Figure 7:
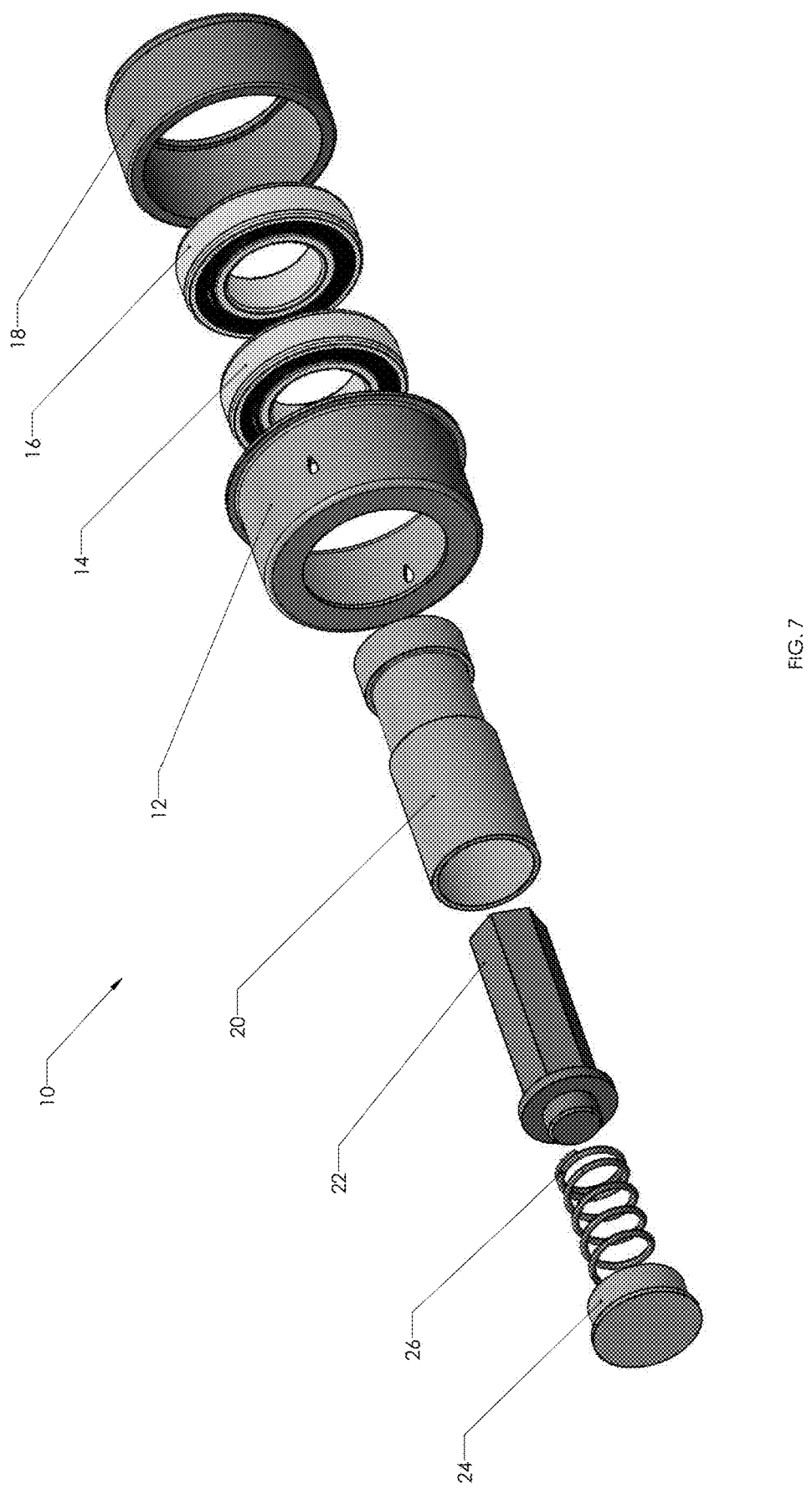
FIG. 7 is a second end exploded perspective view of the spring-loaded bearing assembly of FIG. 1.
Figure 8:
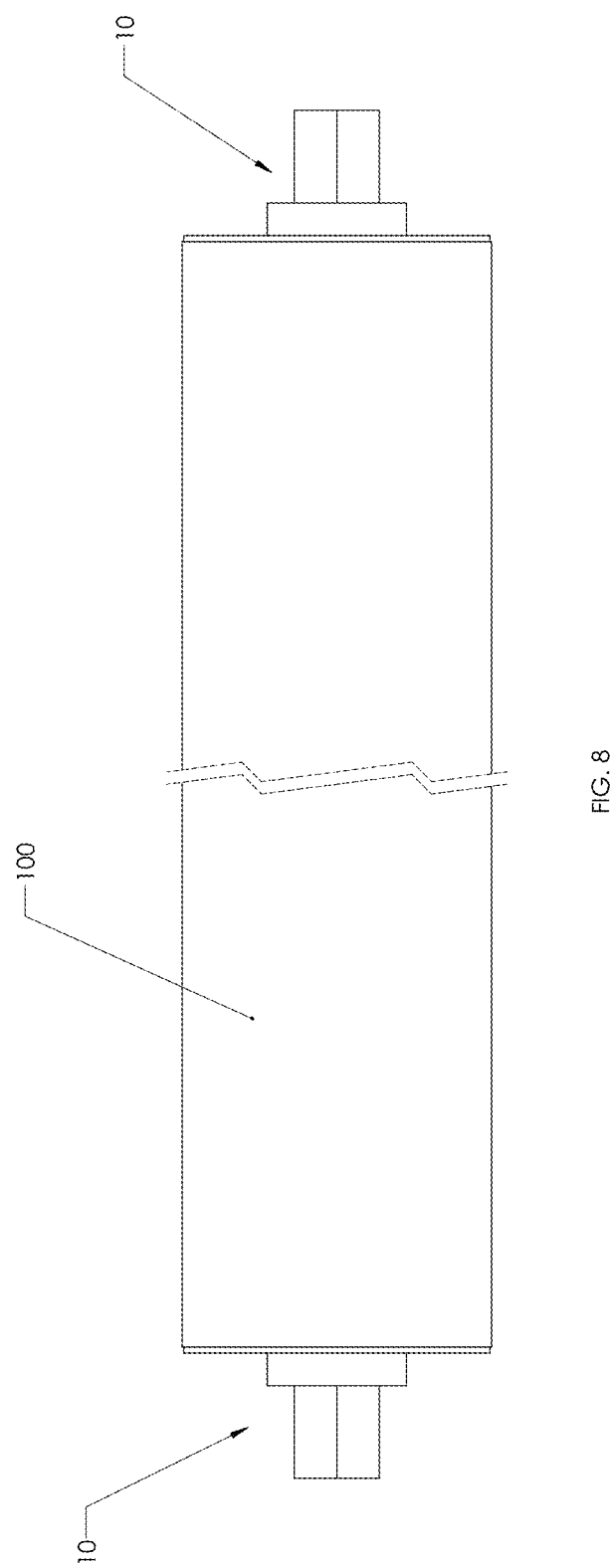
FIG. 8 is a side elevation view of the spring-loaded bearing assembly of FIG. 1 installed into a roller tube of a roller for a conveyor system.
Figure 9:
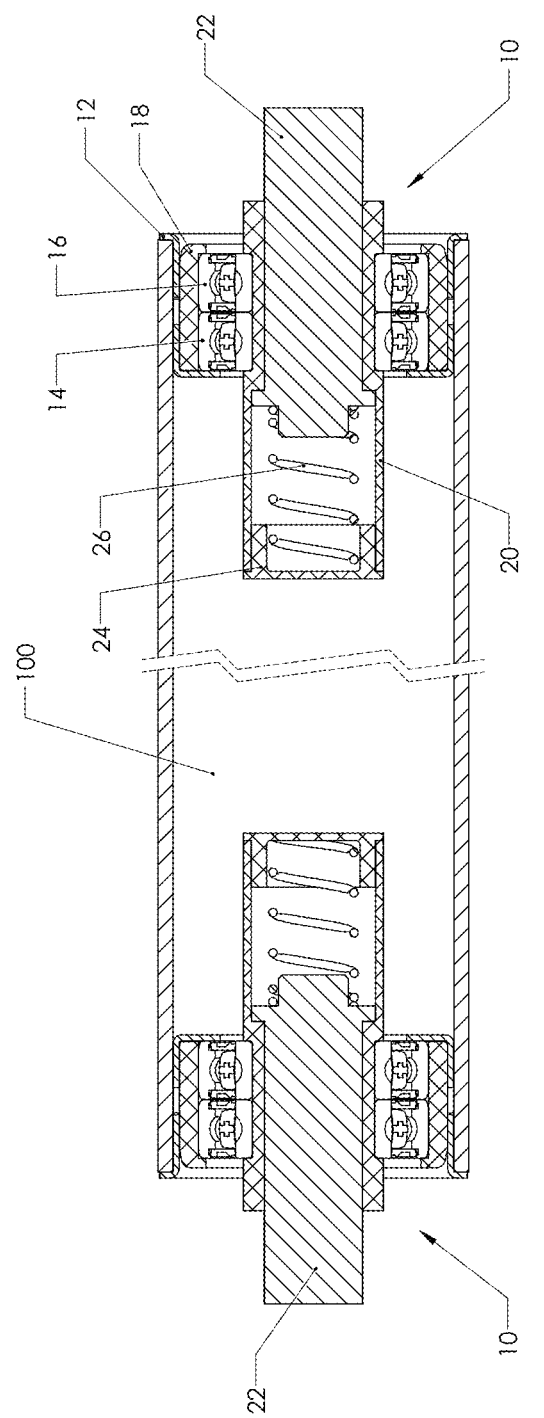
FIG. 9 is a cross-sectional side elevation view of the spring-loaded bearing assembly of FIG. 1 installed into a roller for a conveyor system.

The drawings show an illustrative embodiment of a spring-loaded bearing assembly 10 according to the present disclosure.

The spring-loaded bearing assembly 10 includes: a bearing cup 12; a first cartridge bearing 14 disposed within the bearing cup 12; a second cartridge bearing 16 disposed within the bearing cup 12 axially adjacent to the first cartridge bearing 14; a sleeve 18 disposed radially between the bearing cup 12 and the first and second cartridge bearings 14, 16; a bushing 20 disposed radially within the first and second cartridge bearings 14,16; a shaft 22 disposed radially within the bushing 20; an end cap 24 covering an open end of the bushing 20; and a biasing member 26 disposed axially between the shaft 22 and the end cap 24 and configured to bias the shaft 22 axially relative to the bushing 20.

The bearing cup 12 is shown as having a generally annular sidewall 12A, a first flange 12B extending radially outwardly from a first end of the sidewall 12A, and a second flange 12C extending radially inwardly from a second end of the sidewall 12A. The second flange 12C defines an opening 12D therethrough. The opening 12D is sized to receive the bushing 20 therethrough and to preclude passage of the first and second cartridge bearings 14, 16 therethrough when assembled thereto as shown. The annular sidewall 12A of the bearing cup 12 may include one or more apertures 12E therethrough configured to receive one or more portions of the sleeve 18 therethrough as will be discussed further below. The bearing cup 12 may be made of steel or any other suitable material, for example, another metal or a polymeric material.

The first cartridge bearing 14 is shown as a radial cartridge bearing having an outer race 14A, an inner race 14B, and bearing elements (for example, balls) 14C disposed between and in rolling engagement with the outer race 14A and the inner race 14B. The first cartridge bearing 14 may include one or more bearing retainers 14D configured to retain the bearing elements 14C as would be understood by one skilled in the art. The outer race 14A of the first cartridge bearing 14 is engaged in abutment with the sleeve 18, as will be discussed further below, so that the outer race 14A remains stationary with respect to the bearing cup 12 during normal use and/or operation of the bearing assembly 10. The inner race 14B of the first cartridge bearing 14 is engaged in abutment with the bushing 20, as will be discussed further below, so that the inner race 14B remains stationary with respect to the bushing 20 during normal use and/or operation of the bearing assembly 10. The first cartridge bearing 14 may further include a seal or shield as would be understood by one skilled in the art.

The second cartridge bearing 16 similarly is shown as a radial cartridge bearing having an outer race 16A, an inner race 16B, and bearing elements (for example, balls) 16C disposed between and in rolling engagement with the outer race 16A and the inner race 16B. The second cartridge bearing 16 may include one or more bearing retainers 16D configured to retain the bearing elements 16C as would be understood by one skilled in the art. The outer race 16A of the second cartridge bearing 16 is engaged in abutment with the sleeve 18, as will be discussed further below, so that the outer race 16A remains stationary with respect to the bearing cup 12 during normal use and/or operation of the bearing assembly 10. The inner race 16B of the second cartridge bearing 16 is engaged in abutment with the bushing 20, as will be discussed further below, so that the inner race 16B remains stationary with respect to the bushing 20 during normal use and/or operation of the bearing assembly 10. The second cartridge bearing 16 may further include a seal or shield as would be understood by one skilled in the art.

As shown, the first cartridge bearing 14 is matched to the second cartridge bearing 16, meaning that the first and second cartridge bearings 14, 16 are engaged in abutment with each other. Although the first and second cartridge bearings 14, 16 are shown as radial cartridge bearings, they could be angular contact cartridge bearings matched face-to-face (sometimes referred to as a face-to-face duplex bearing combination), back-to-back (sometimes referred to as a back-to-back duplex bearing combination), or in tandem (sometimes referred to as a tandem duplex bearing combination) as would be understood by those skilled in the art. In embodiments, an intervening spacer (not shown) may be disposed axially between the first and second cartridge bearings 14, 16 and in abutment with both of the first and second cartridge bearings 14, 16, for example, the outer races 14A, 16A of the first and second cartridge bearings.

The sleeve 18 is shown as having a general annular sidewall 18A and a flange 18B extending radially inwardly from a first end of the sidewall 18A. The flange 18B defines an opening 18C therethrough. The opening 18C is sized to receive the bushing 20 therethrough and to preclude passage of the first and second cartridge bearings therethrough when assembled as shown. As suggested above, the annular sidewall 18A of the sleeve 18 is disposed radially between the annular sidewall 12A of the bearing cup 12 and the outer races 14A, 16A of the first and second cartridge bearings 14, 16 in fixed engagement therewith. As shown, the first end of the annular sidewall 18A is beveled radially inwardly at an angle α. This bevel may be provided to facilitate swaging of corresponding end of the annular sidewall 12A of the bearing cup 12 to the sleeve 18. The sleeve 18 may be made of a polymeric material or another suitable material. In embodiments, the sleeve 18 may be insert-molded to a subassembly including the bearing cup 12 and the first and second cartridge bearings 14, 16, as would be understood by one skilled in the art. As suggested above, one or more portions (not shown) of the sleeve 18 may extend into or through the apertures 12E defined by the sidewall 12A of the bearing cup, for example, consequent to the injection molding process.

The bushing 20 is shown as having a generally annular sidewall 20A having an outer surface 20B and an inner surface 20C. A first region 20D of the outer surface 20B has a first outer diameter complementary to corresponding inner diameters of the inner races 14B, 16B of the first and second cartridge bearings 14, 16. A second region 20E of the outer surface 20B extending axially from the first region of the outer surface has a second outer diameter greater than the first outer diameter. The first and second regions 20D, 20E of the outer surface 20B cooperate to capture the inner races 14B, 16B of the first and second cartridge bearings 14, 16 to the bushing 20 in fixed engagement therewith. The bushing 20 may be made of a polymeric material or another suitable material. In embodiments, the bushing 20 may be insert-molded to the first and second cartridge bearings 14, 16, as would be understood by one skilled in the art.

A first region 20F of the inner surface 20C of the bushing 20 has a first inner contour configured to receive a corresponding portion of the shaft 22 in sliding engagement with little or no radial play, as will be discussed further below. In the illustrated embodiment, the first inner contour of the inner surface 20C and the corresponding portion of the shaft have hexagonal cross-sections such that the bushing 20 and the shaft 22 are in keyed sliding engagement with each other. In other embodiments, the first inner contour of the inner surface 20C and the corresponding portion of the shaft 22 may have other cross-sectional shapes. In some embodiments, the bushing 20 and the shaft 22 need not be keyed to each other. A second region 20G of the inner surface 20C of the bushing 20 has an inner contour complementary to an outer contour of the spring 26 and to an outer contour of a spring perch of the shaft 22, as will be discussed further below. As shown, the inner contour of the second region 20G of the inner surface 20C of the bushing 20 is cylindrical and has an inner diameter.

The shaft 22 is shown as an elongated body having a first end 22A and a second end 22B. At least a portion of the shaft extending axially from the first end 22A has an outer contour complementary to the inner contour of the first region 20F of the inner surface 20C of the bushing 20 so that the shaft 22 is in sliding engagement with the bushing with little or no radial play. A flange or shoulder 22C extends radially outwardly from the body of the shaft 22 proximate the second end 22B of the shaft 22. The shoulder 22C defines a spring perch in the form of a land 22D configured to receive an end of the spring 26 in axially bearing engagement, as will be discussed further below. As shown, the shoulder 22C has an outer diameter corresponding to the inner diameter of the second region 20G of the inner surface 20C of the bushing 20 to allow for sliding engagement of the shoulder 22C with the inner surface 20C of the bushing 20 with little or no radial play.

The shaft 22 is shown as having a hexagonal cross section from the first end 22A thereof to the shoulder 22C thereof, and a circular cross section from the shoulder 22C thereof to the second end thereof. In other embodiments, at least the portion of the shaft 22 from the first end 22A thereof to the shoulder 22C could have other cross-sectional shapes complementary to the inner contour of the first region 20F of the inner surface 20C of the bushing 20. As shown, the portion of the shaft 22 from the first end 22A thereof to the shoulder 22C is of uniform cross section. In other embodiments, the portion of the shaft 22 from the first end 22A thereof to the shoulder 22C could taper radially inwardly.

As shown, the second end 22B of the shaft 22 defines a boss 22E extending axially from the shoulder 22C. The boss 22E may be configured to receive a corresponding end of the spring 26 and thereby radially restrain the corresponding end of the spring 26, as will be discussed further below. Additionally or alternatively, the second end 22B of the shaft may define a counterbore (not shown) extending axially into the body of the shaft 22. In such an embodiment, the counterbore (not shown) may be configured to receive and radially restrain the corresponding end of the spring 26, and the body of the shaft 22 at the axially inner end of the counterbore may define a spring perch.

One skilled in the art would understand that a region of the shaft 22 extending axially from the first end 22A thereof toward the second end 22B thereof is configured for engagement with a complementary structure, for example, a frame supporting rollers of a conveyor system. As shown, the foregoing region of the shaft 22 is of uniform cross section, meaning that it does not taper radially inwardly or outwardly. In embodiments, the foregoing region of the shaft 22 may taper radially inwardly.

The end cap 24 is shown as having a generally annular sidewall 24A and a flange 24B connected to a first end of the sidewall 24A. The end cap 24 is in fixed engagement, for example, press-fit, snap-fit, interference-fit, bonded, or welded engagement, with the bushing 20. As shown, the annular sidewall 24A of the end cap 24 is received within the sidewall 20A of the bushing 20 at the second end 20B thereof in fixed engagement therewith. The end cap 24 is configured to provide an axial bearing surface for the spring 26, as will be discussed further below.

The spring 26 is shown as a helical compression spring having a first end 26A, a second end 26B, an outer diameter, and an inner diameter. The first end 26A of the spring 26 is in axial bearing engagement with the spring perch, for example, land 22D, of the shaft 22. The second end 26B of the spring 22 is in axial bearing engagement with an interior surface of the flange 24B of the end cap 24. In embodiments, the second end 26B of the spring 22 may instead be in axial bearing engagement with another portion of the end cap 24, for example, an end portion of the sidewall 24A of the end cap 24. The spring 26 may be preloaded, as would be understood by one skilled in the art. Although the spring 26 is shown as a helical compression spring, it could be embodied as any suitable form of biasing member, for example, a resilient, compressible elastomer. The second end 22B of the shaft 22 and the end cap 24 could be modified as might be necessary and as would be understood to one skilled in the art to accommodate such a biasing member. When assembled as shown, the spring 26 biases the shaft 22 axially in a direction away from the end cap 24. The spring 26 is compressible so that shaft 22 may be displaced toward the end cap 24 in response to an axial force applied to the shaft.

The bearing assembly 10 may be installed into a mechanical component, for example, without limitation, a roller tube 100 of a roller for a conveyor system (not shown) such that the bearing cup 12 is received in the component. The bearing cup 12 may be fixed to the roller tube 100, for example, by swaging, press-fit, snap-fit, interference-fit, bonding, or welding, to preclude inadvertent disassembly of the bearing cup 12 from the roller tube 100, as would be understood by those skilled in the art.

The embodiments shown and described herein are exemplary and should not be construed to limit the scope of the invention, which is defined by the appended claims. Those skilled in the art would understand that the foregoing disclosure could be modified without departure from the scope of the claims.

The invention claimed is:

1. A spring-loaded bearing assembly comprising:
   a steel bearing cup having a sidewall and a first flange extending radially inwardly from a first end of the sidewall;
   a first cartridge bearing having an inner race and an outer race, the first cartridge bearing disposed within the steel bearing cup;
   a second cartridge bearing having an inner race and an outer race, the second cartridge bearing disposed within the steel bearing cup beside the first cartridge bearing;
   an annular sleeve having a sidewall disposed between the steel bearing cup and the respective outer races of the first cartridge bearing and the second cartridge bearing;
   an annular bushing having a sidewall disposed within and axially retained by the inner race of the first cartridge bearing and the inner race of the second cartridge bearing, the annular bushing extending axially through the first flange of the steel bearing cup;
   an end cap connected to an end of the annular bushing;
   a shaft having a spring perch proximate an end thereof, the shaft slidingly engaged with an interior surface of the annular bushing; and
   a biasing member disposed within an interior region of the annular bushing, the biasing member captured between the end cap and the spring perch, the biasing member configured to axially bias the shaft relative to the annular bushing.

2. The spring-loaded bearing assembly of claim 1, wherein the first cartridge bearing and the second cartridge bearing are matched.

3. The spring-loaded bearing assembly of claim 1, wherein the first cartridge bearing and the second cartridge bearing are in axial abutment with each other.

4. The spring-loaded bearing assembly of claim 1, wherein the annular bushing is made of polymeric material.

5. The spring-loaded bearing assembly of claim 4, wherein the annular bushing is insert-molded to the first cartridge bearing and the second cartridge bearing.

6. The spring-loaded bearing assembly of claim 1, wherein the annular sleeve is made of polymeric material.

7. The spring-loaded bearing assembly of claim 1, wherein the annular sleeve comprises a flange extending radially inward from proximate a first end of the sidewall thereof, the flange configured to preclude or limit axial displacement of the first and second cartridge bearings relative thereto.

8. The spring-loaded bearing assembly of claim 7, wherein an outer surface of the sidewall of the annular sleeve extends in a radially inward direction, and wherein the sidewall of the steel bearing cup is swaged in a radially inward direction proximate the radially inward extension of the outer surface of the sidewall of the annular sleeve to thereby preclude disengagement of the annular sleeve from the steel bearing cup.

9. The spring-loaded bearing assembly of claim 8, wherein the outer surface of the sidewall of the annular sleeve extends in a radially inward direction proximate the flange of the annular sleeve.

10. The spring-loaded bearing assembly of claim 1, wherein a free end of the shaft extending axially outwardly from the annular bushing is untapered.

11. The spring-loaded bearing assembly of claim 10, wherein the free end of the shaft has a hexagonal cross-sectional profile.

12. The spring-loaded bearing assembly of claim 1, wherein the first cartridge bearing axially abuts the second cartridge bearing.

13. The spring-loaded bearing assembly of claim 1, wherein the shaft is axially keyed to the annular bushing.

14. The spring-loaded bearing assembly of claim 1, wherein the biasing member is a compression spring.

15. The spring-loaded bearing assembly of claim 1 in combination with a roller tube, wherein the steel cup is disposed within the roller tube proximate a first end of the roller tube.

16. The combination of claim 15, wherein the spring-loaded bearing assembly is fixed to the roller tube.

17. The combination of claim 15, wherein the roller tube is swaged to the steel bearing cup proximate the first end of the conveyor roller.

18. The combination of claim 15, wherein the roller tube is swaged to the spring-loaded bearing assembly.

19. A spring-loaded bearing assembly comprising:
   a steel bearing cup having a sidewall and a first flange extending radially inwardly from a first end of the sidewall;
   a first cartridge bearing having an inner race and an outer race, the first cartridge bearing disposed within the steel bearing cup;
   a second cartridge bearing having an inner race and an outer race, the second cartridge bearing disposed within the steel bearing cup beside the first cartridge bearing;
   a polymeric annular sleeve having a sidewall disposed between the steel bearing cup and the respective outer races of the first cartridge bearing and the second cartridge bearing;

a polymeric annular bushing having a sidewall disposed within and axially retained by the inner race of the first cartridge bearing and the inner race of the second cartridge bearing, the polymeric annular bushing extending axially through the first flange of the steel bearing cup;

an end cap connected to an end of the polymeric annular bushing;

a shaft having a shoulder proximate a first end thereof, the shaft slidingly engaged with an interior surface of the polymeric annular bushing, the shoulder limiting axial displacement of the shaft relative to the polymeric annular bushing; and a spring disposed within an interior region of the polymeric annular bushing, the spring captured between the end cap and the shoulder, the spring configured to axially bias the shaft relative to the polymeric annular bushing.

20. The spring-loaded bearing assembly of claim 19 in combination with a roller tube, wherein the steel bearing cup is in fixed engagement with the roller tube proximate a first end of the roller tube.

\* \* \* \* \*